3,133,902
2-PHENYL-ALLYL CARBANILATE AND
POLYMERS THEREOF
Jerrold R. Denchfield, Chicago Heights, and Robert P. Zmitrovis, Park Forest, Ill., assignors to Sinclair Research, Inc., Wilmington, Del., a corporation of Delaware
No Drawing. Filed Mar. 26, 1962, Ser. No. 182,626
6 Claims. (Cl. 260—77.5)

This invention relates to the production of valuable organic monomeric products by the reaction of 2-phenyl allyl alcohols and organic isocyanates and the homopolymers thereof. More specifically this invention relates to the reaction of 2-phenyl allyl alcohols with isocyanates having the general formula R—N=C=O where R is a monovalent hydrocarbon radical, for instance, of up to about 12 carbon atoms.

The monomers obtainable by this invention can be used in the preparation of dyestuffs and textiles. They are particularly suitable for use in the production of plastics where especially high molecular products containing isocyanate groups can be employed as cross-linking agents. Completely cross-linked solid products can be prepared by homopolymerization, which products are useful as thermal stabilizers in polymerization reactions. The homopolymers may also be used directly as plastics for numerous applications, for example, for electrical insulation purposes or as water-proofing agents or with fillers, dyes, pigments, opacifiers, etc., in a wide variety of casting, molding and laminating applications or as impregnants and decorative surface-coating materials such as metal, wood, synthetic resins or as a finish coating over painted surfaces.

The new monomeric compounds may be prepared by the reaction of 2-phenyl-allyl alcohol which may, if desired, be substituted as with a lower alkyl group in the phenyl radical, with an organic isocyanate of the type described above to produce a product having a structural formula of

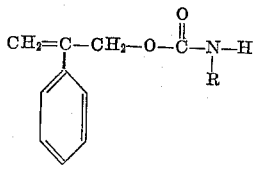

As stated above, R is a hydrocarbon radical having up to about 12 or more carbon atoms. The product may contain additional olefinic unsaturation and may contain any substituent, e.g. alkyl groups, as long as such substituent does not interfere with the reaction of this invention. The isocyanate may also be a polyisocyanate for example, a di-isocyanate. Representative examples are the aliphatic compounds such as methyl, ethyl, propyl, n-butyl, isobutyl, amyl, hexyl, heptyl, octyl, ethylene, trimethylene, propylene, butylene isocyanate; the cycloaliphatic compounds such as cyclopropane, 1,1-di-methyl-cyclopentane, cyclopentylene-1,3, cyclohexylene-1,4 and cyclohexylene 1,2 isocyanates; the aromatic compounds such as phenyl, m-tolyl, beta-naphthyl, 3-biphenyl, alkoxyphenol, p-chlorophenyl, m-chlorophenyl, p-cyanophenyl isocyanates; the aliphatic-aromatic compounds such as benzyl, phenyl, ethyl or others in which the aromatic radical is nuclear substituted by groups which do not interfere with the reaction of this invention. Useful polyisocyanates include for instance, the aliphatic compounds such as ethylene, trimethylene, tetramethylene, pentamethylene, propylene-1,2, butylene-1,2, diisocyanates; the cycloalkylene compounds such as cyclopentylene-1,3, cyclohexylene-1,4 diisocyanates; the aromatic compounds such as toluene diisocyanate. Tri- and tetra-isocyanates may also be used. All of the isocyanates used in the practice of this invention are either commercially available or may be conveniently prepared by known reactions.

The 2-phenyl-allyl alcohol used in this invention may be prepared by any known reaction such as reacting alpha-methyl styrene in the presence of acetice anhydride and hydrolyzing the product formed. The alcohol may also be nuclearly substituted with, for instance an alkyl substituent, preferably one having up to four carbon atoms, or more or any substituent which would not interfere with the reaction of this invention.

The quantities of reactants used are not critical and may be varied considerably. For example, equimolar quantities of the alcohol and the isocyanate may be used. Preferably, however, the number of moles of the alcohol is slightly higher, for instance, from greater than 1 to about 3 times that of the isocyanate.

The monomers of this invention may be conveniently prepared by heating the reactants in a vessel at temperatures ranging from ambient temperatures up to about 200° C. or more. The reaction may, if desired, be conducted in a solvent, that is inert to both reactants such as benzene, ether, cyclohexane, heptane and other hydrocarbons. Generally, the reaction period ranges from a few seconds to about one hour or longer. The rate of reaction may be better controlled by continuously or intermittently introducing the isocyanate into the reaction mixture during the reaction. This expedient enables a monomer to be obtained having a more uniform composition and is thus a desirable manner of operation in executing the process of the invention.

The following examples illustrate specific embodiments of this invention. All parts and percentages are by weight unless otherwise indicated.

*Example I*

10 ml. of phenyl isocyanate, 50 ml. of cyclohexane and 15 ml. of 2-phenyl allyl alcohol were charged to a glass reaction vessel and heated to a temperature of 70° C. for about 1 hour with stirring. The reaction mass was filtered and purified and the solid monomer was analyzed by spectroscopic methods to confirm the allylic double bond.

*Example II*

Using the procedure described in the preceding example, 15 ml. of n-butyl isocyanate, 75 ml. of cyclohexane and 20 ml. of 2-phenyl allyl alcohol were charged to the reaction vessel to produce a liquid monomer of this invention.

The monomers of this invention are ideally suited for polymerization reactions which may be readily effected in accordance with the usual polymerization practices employed for polymerizing unsaturated materials. Many of the monomers prepared as outlined above are liquid and hence can be polymerized either alone or in admixture with other polymerizable materials without the use of a polymerization medium, although the polymerization can be effected by means of solution polymerization in either aqueous or solvent media. The polymerization is facilitated by the use of a catalyst and elevated temperatures. The nature of the catalyst is not critical, and any of the well known catalytic materials can be employed. Usually the so-called per-catalysts such as the peroxides and persulfates are employed to catalyze the polymerization. Such materials are well known in the art, and it is not intended that the scope of the invention shall be limited to the use of any particular catalytic materials. Typical per-catalysts which are useful include such materials as benzoyl peroxide, hydrogen peroxide, potassium persulfate and the like. Friedel-Crafts type catalysts such as aluminum chloride, aluminum bromide, titanium tetrachloride, boron trifluoride, uranium chloride or the like may also be employed as well as Ziegler type catalysts. These catalysts are alkyl aluminum compounds or complexes of alkyl aluminum compounds. More generally, the useful catalysts are compounds having reducing properties such as the above or mixtures of such compounds and a reducible compound of a heavy metal. The catalysts include the hydrides, alkyl or aryl derivatives of the metals aluminum, gallium, indium, beryllium, or zinc; their complexes with organic compounds, e.g. with ethers, thioethers, amines, thiophenols, carboxylic acids and sulfonic acids; or in complex linkage with alkali or alkaline earth metal hydrides, alkyls or aryls, e.g. sodium aluminum tetraphenyl. Also, the alloys or hydrides of alkali metals or alkaline earth metals are useful. Also complex compounds of the hydrides of these metals with aluminum hydride, boron hydride, alkyl or aryl borides, alkyl or aryl esters of boric acid are effective. Examples are aluminum trimethyl, aluminum triphenyl, gallium trimethyl, indium trimethyl and beryllium diphenyl. Also, halogen derivatives of the aluminum alkyls or aryls are useful, particularly the monohalides.

The reducible heavy metal compound which can be used with the above metal compounds and complexes is that of a metal of groups IV, VI and VIII of the periodic table. For example, titanium, zirconium, hafnium, thorium, etc. Also, iron, cobalt, nickel and manganese are useful. The preferred salts of the metals are the halides, oxyhalides, complex halides (e.g. fluorides), freshly precipitated oxides or hydroxides, alkoxides, acetates, benzoates or acetonyl acetonate. The preferred salts of titanium or zirconium are the tetrachloride, oxychloride or the acetonylacetonate. The reaction may also be catalyzed by heat, light or radiation.

Temperatures of from about ambient temperature to about 100 to 200° C. or more are usually employed in effecting the polymerization, although higher or lower temperatures can be employed in accordance with usual practice. The reaction time will depend, of course, upon the reactants employed, their physical nature, i.e. solid or liquid, the nature and amount of polymerization catalyst, the temperature of polymerization chosen and similar variable factors. Thus, for example, the polymerization may be effected in a period of from a few minutes or hours to several days depending upon the reaction conditions.

The following example is provided as a further illustrative specific embodiment of the invention.

*Example III*

A mixture of 10 grams of 2-phenyl-allyl-butyl-carbamate and 0.5 grams of benzoyl peroxide are heated together in an atmosphere of nitrogen in a closed reaction vessel which is placed in an oil bath maintained at 60° C. The vessel is fitted with a reflux condenser and the mixture is stirred for about 5 hours. The reaction mass, filtered and purified, is a solid pliable polymer and is analyzed by spectroscopic methods to confirm the allylic structure.

In addition to preparing homopolymers as outlined above, the monomeric material of this invention may also be used to produce a copolymer as outlined in the copending application of Jerrold R. Denchfield, Serial No. 182,625 (1–1204 A), filed concurrently herewith by reacting said monomeric material with any of the well-known ethylenically unsaturated hydrocarbons (>C=C<) containing, for instance, up to about 12 or 18 carbon atoms or more. Representative examples of useful compounds are monoolefins such as ethylene or a substitution product thereof, a diene or diolefin, triolefin, etc. Specifically, unsaturated compounds that are suitable are ethylene, propylene, 1- and 2-butene, 1- and 2-pentene, 1- and 2-hexene, 1- and 2-ocetene, 1-dodecene, isobutylene, 2-methyl-1-butene, 3-methyl-1-butene, 4-methyl-1-pentene, 4-vinyl-cyclohexene, 2-methyl-2-butene, cyclohexene, 1,4-pentadiene, 1,5-hexadiene, 2-methyl-1,5-hexadiene, 3,3-dimethyl-1,5-hexadiene, 1,7-octadiene, 1,9-decadiene, butadiene, isoprene and vinyl aromatic compounds such as styrene, alpha-methylstyrene, p-methylstyrene, p-methoxystyrene and vinyl naphthalene. α-olefins are preferred.

In the production of copolymers, the proportions of copolymerizable materials may be varied over a wide range, as desired or as conditions may require, e.g. from by weight 1 to 99%, of the monomer of this invention to from 99 to 1% of the other copolymerizable ingredient. Particularly useful copolymer compositions are obtained when the mixture of copolymerizable materials contains a mole ratio of about 1:1–10 of either copolymerizable material.

It is claimed:

1. A new composition of matter having the general formula

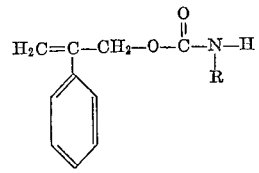

where R is a monovalent hydrocarbon radical containing up to about 12 carbon atoms.

2. The composition of claim 1 in which R is n-butyl.
3. The composition of claim 1 in which R is phenyl.
4. A composition comprising a solid homopolymer of

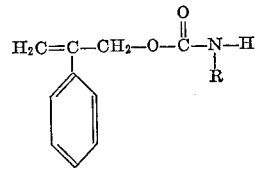

where R is a hydrocarbon radical containing up to about 12 carbon atoms.

5. The composition of claim 4 in which R is n-butyl.
6. The composition of claim 4 in which R is phenyl.

References Cited in the file of this patent

UNITED STATES PATENTS

| | | |
|---|---|---|
| 2,384,074 | Chenicek | Sept. 4, 1945 |
| 2,464,519 | Lichty | Mar. 15, 1949 |
| 2,483,194 | Oleim | Sept. 27, 1949 |
| 2,556,437 | Mowry | June 12, 1951 |